United States Patent
Spiessl et al.

(10) Patent No.: US 8,545,297 B2
(45) Date of Patent: Oct. 1, 2013

(54) AIR-FLAP DEVICE FOR A REFRIGERATOR AND/OR FREEZER FOR EQUIPPING A KITCHEN

(75) Inventors: Georg Spiessl, Willhof-Altendorf (DE); Anthony Durfee, Jackson, TN (US)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 1446 days.

(21) Appl. No.: 12/160,391

(22) PCT Filed: Jan. 8, 2007

(86) PCT No.: PCT/EP2007/000095
§ 371 (c)(1), (2), (4) Date: Jul. 9, 2008

(87) PCT Pub. No.: WO2007/082649
PCT Pub. Date: Jul. 26, 2007

(65) Prior Publication Data
US 2010/0162746 A1    Jul. 1, 2010

(30) Foreign Application Priority Data
Jan. 12, 2006 (DE) .......................... 10 2006 001 679

(51) Int. Cl.
*F25D 17/08* (2006.01)

(52) U.S. Cl.
USPC .......................................... 454/333; 454/237

(58) Field of Classification Search
USPC .................... 454/237, 333; 137/595
See application file for complete search history.

(56) References Cited

U.S. PATENT DOCUMENTS

| 4,644,239 A | 2/1987 | Yoshikawa et al. |
| 4,741,170 A | 5/1988 | Tershak |
| 4,852,361 A * | 8/1989 | Oike .............................. 62/131 |

(Continued)

FOREIGN PATENT DOCUMENTS

| DE | 69304647 T2 | 4/1994 |
| DE | 10028483 A1 | 3/2001 |
| GB | 1026533 | 4/1966 |
| GB | 1118353 | 7/1968 |

(Continued)

*Primary Examiner* — Steven B McAllister
*Assistant Examiner* — Samantha Miller
(74) *Attorney, Agent, or Firm* — Robert R. Deleault, Esq.; Mesmer & Deleault, PLLC

(57) ABSTRACT

An air-flap device for a refrigerator and/or freezer for equipping a kitchen comprises an air flap (18) which is mounted so as to be pivotable about a first axis of rotation (20) between an open position and a closing position and which, in the open position, unblocks an air-passage aperture (16) for the passage of air and, in the closing position, blocks said air-passage aperture, at least substantially, against the passage of air, and said air-flap device also comprises a motorized flap-actuating mechanism for displacing the air flap in a pivoting manner. According to the invention, the flap-actuating mechanism comprises a movably disposed flap-actuating element (26) having a flap-engaging section (32) which can be moved, as a result of movement of said flap-actuating element, from outside the pivoting space of the air flap into said pivoting space in order, in doing so, to pass into engagement with the air flap and lift the latter out of one of the two flap positions towards the other. The flap-actuating element (26) is preferably a body of revolution which is disposed so as to be rotatable about a second axis of rotation (28) which is substantially parallel to the first axis of rotation (20) but extends at a distance from the latter.

17 Claims, 2 Drawing Sheets

(56) References Cited

U.S. PATENT DOCUMENTS

| | | | |
|---|---|---|---|
| 5,018,364 A | 5/1991 | Chesnut et al. | |
| 5,172,566 A | 12/1992 | Jung et al. | |
| 5,375,413 A * | 12/1994 | Fredell et al. | 62/187 |
| 5,876,014 A * | 3/1999 | Noritake et al. | 251/129.12 |
| 6,069,466 A * | 5/2000 | Noritake et al. | 318/685 |
| 6,301,910 B1 * | 10/2001 | Noritake et al. | 62/187 |
| 6,330,891 B1 * | 12/2001 | Noritake | 137/595 |
| 2005/0189184 A1 * | 9/2005 | Osvatic et al. | 188/138 |

FOREIGN PATENT DOCUMENTS

| | | |
|---|---|---|
| JP | 57000472 | 1/1982 |
| JP | 62024083 | 2/1987 |
| JP | 62101985 | 5/1987 |
| JP | 62283275 | 12/1987 |
| JP | 63254273 | 10/1988 |
| JP | 01028471 | 1/1989 |
| JP | 01316577 | 12/1989 |
| JP | 01318877 | 12/1989 |

* cited by examiner

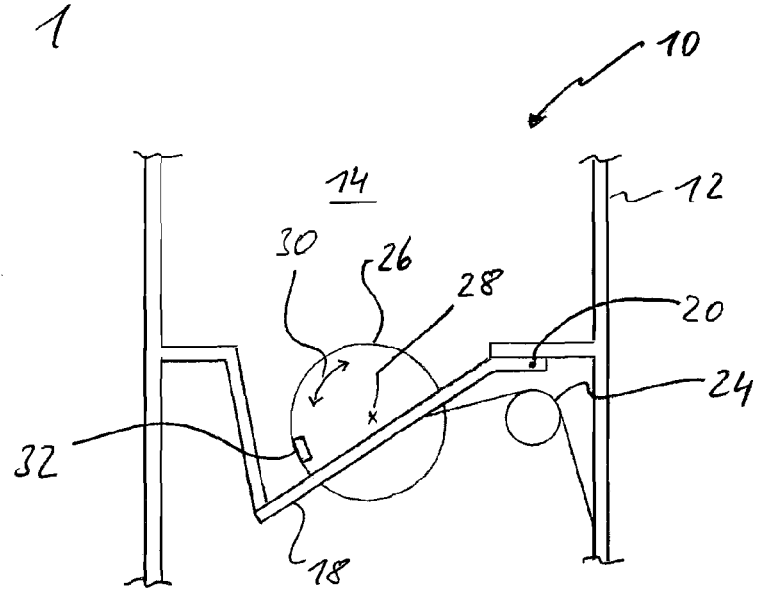
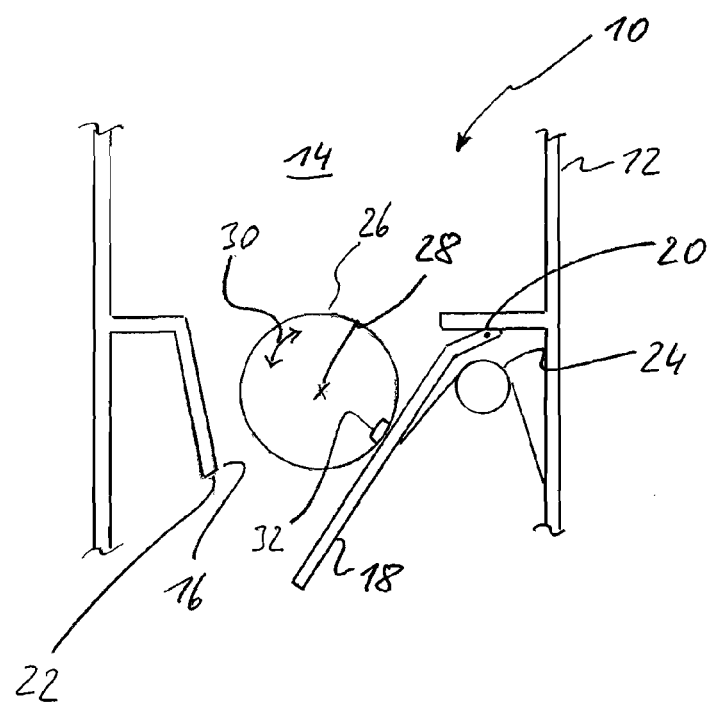

AIR-FLAP DEVICE FOR A REFRIGERATOR AND/OR FREEZER FOR EQUIPPING A KITCHEN

The invention relates to an air-flap device for a refrigerator and/or freezer for equipping a kitchen, said device comprising:

an air flap which is mounted so as to be pivotable about a first axis of rotation between an open position and a closing position and which, in the open position, unblocks an air-passage aperture for the passage of air and, in the closing position, blocks said air-passage aperture, at least substantially, against the passage of air; and a motorized flap-actuating mechanism for displacing the air flap in a pivoting manner.

Air-flap devices of this kind are used for controlling the influx of cold air into a refrigerating chamber in a refrigerator and/or freezer for kitchen-management purposes. As a rule, such refrigerators and/or freezers contain at least one refrigerating chamber, in which a preset temperature is to be maintained (the term "refrigerating chamber" is to be understood here in a general way to mean a chamber within the appliance which is to be kept cool, whether above or below freezing point, and should therefore, in particular, not be differentiated from a freezing chamber, but should include such a chamber within the concept). The inflow of available cold air into the refrigerating chamber can be permitted or cut off, depending upon the temperature measured in said refrigerating chamber, by means of an air-flap device of the kind under consideration here. This cold air may originate, for example, from another refrigerating chamber, which is colder, relatively speaking, within the refrigerator and/or freezer. Thus for example, in a combined fridge-freezer, the cold air may originate from a freezing section of the appliance and be introduced into a refrigerating section which serves for keeping foods cool but not for freezing them. It is likewise possible, in a refrigerator or chest freezer with various refrigerating compartments which are to be kept at different degrees of coldness, to envisage causing cold air to flow from one of the cooling compartments which is colder, relatively speaking, to one which is warmer, relatively speaking, in a manner controlled via an air-flap device. No limitation to certain locations of use within a refrigerator and/or freezer is intended within the scope of the invention.

Known forms of embodiment of an air-flap device of the above kind have an electric driving motor which is coupled in a permanent rotating-drive connection—normally via an interposed transmission—to an air flap which occludes or unblocks an airpassage aperture in a position-dependent manner. An example of this is found in U.S. Pat. No. 5,018,364. In its closing position, the air flap must be able to usually occlude the pass-through aperture in a comparatively leak-proof manner. The formation of ice can lead to the air flap freezing fast to the edges of the air-passage aperture. The formation of ice can also impair the rotational mobility of the components which serve for mounting the air flap in a pivoting manner. Since, under normal circumstances, opening of the air flap is necessary only at comparatively long time intervals (long, at any rate, compared to the time within which ice is able to form on the components of the air-flap device), the freezing-fast of the air flap is a problem which is to be encountered extremely frequently. However, if the air flap is frozen fast, the driving motor must be able to apply a correspondingly high moment in order to break open the iced-up area. If it is unable to do so, damage to the motor is possible because of sustained excessively high current consumption.

The object of the invention is to make possible increased functional reliability in an air-flap device of the kind initially referred to.

In order to achieve this object, provision is made, according to the invention, for the flap-actuating mechanism of the air-flap device to comprise a movably disposed flap-actuating element having a flap-engaging section which can be moved, as a result of movement of said flap-actuating element, from outside the pivoting space of the air flap into said pivoting space in order, in doing so, to pass into engagement with the air flap and lift the latter out of one of the two flap positions towards the other.

In the solution according to the invention, there is no permanent driving coupling between the air flap and a driving motor belonging to the flap-actuating mechanism. Instead, a movable flap-actuating element is provided, which can be driven by such a driving motor. The flap-actuating element possesses a flap-engaging section which is disposed in such a way that it lies outside or inside the pivoting space of the air flap, according to the position of the flap-actuating element. Under these circumstances, said flap-actuating element is disposed in such a way that the flap-engaging section can be brought up to the air flap, from outside the pivoting space of the latter, until it strikes against said air flap. As the flap-actuating element continues to move, the flap-engaging section then lifts the air flap out of its position which it was occupying when struck by the flap-engaging section.

If the air flap is frozen fast, the flap-actuating element can still be moved, that is to say at least within a range in which the flap-engaging section is located outside the pivoting space of the air flap. This can be used to also give the flap-engaging section a motional impetus which facilitates breaking-open of the iced-up area when said flap-engaging sections strikes against the air flap. Accordingly, the driving motor does not have to run up, from standstill, against a resistance caused by icing-up, but can first pick up momentum, so to speak, before the flap-engaging section impinges upon the air flap. This protects the driving motor and allows more reliable breaking-open of any iced-up areas.

In a preferred further development of the air-flap device, the flap-actuating element is disposed so as to be rotatable about a second axis of rotation which is substantially parallel to the first axis of rotation but extends at a distance from the latter, under which circumstances the flap-engaging section can be moved, as a result of rotation of the flap-actuating element, from outside the pivoting space of the air flap into said pivoting space. Nevertheless, the possibility of designing the flap-actuating element with mobility other than rotational mobility should not be ruled out within the scope of the invention. For example, said flap-actuating element might be linearly movable.

If the flap-actuating element is constructed in a rotatable manner, it may be disposed, according to one preferred form of embodiment, in such a way that the flap-engaging section can be moved, as a result of rotation of the flap-actuating element, into the pivoting space of the air flap, through said space and out of it again, under which circumstances the flap-actuating mechanism comprises an electric driving motor which drives the flap-actuating element about the second axis of rotation and which is designed to operate in opposite directions of rotation. In this form of embodiment, the air flap can be actuated in both directions of rotation of the driving motor. This can be used, in particular, for the purpose of operating the driving motor in alternating directions of rotation a number of times in succession in the event of an air flap being frozen fast, if "knocking" of the flap-engaging section against the air flap on a single occasion is still not sufficient to release the iced-up area. The flap-engaging section can thus be moved to and fro a number of times outside the range of pivoting of the air flap, under which circumstances it strikes against the latter on each occasion. The iced-up area can be released still more reliably by repeated "knocking" of this kind.

The driving motor may, for example, be a synchronous motor without directional inhibition in either of the directions of rotation. If configured in a suitable manner, a synchronous motor of this kind can reverse its direction of rotation spontaneously, if the air flap cannot be moved in one direction of rotation. Naturally, the use of an electronically controlled stepping motor may also be envisaged.

The air flap is preferably pretensioned into one of its two positions, so that the driving motor has to overcome the pretensioning in order to lift the air flap out of the said position, under which circumstances, however, automatic resetting of the air flap takes place when the flap-engaging section of the flap-actuating element withdraws from the pivoting space of the air flap again. It is expedient if the starting position into which the air flap is pretensioned is its closing position.

The flap-actuating mechanism may comprise control-face means, which are disposed in a fixed relative location in relation to the flap-engaging section for joint movement with the latter, for the purpose of controlling a mechanically actuatable switching member belonging to at least one electric switch. Under these circumstances, said electric switch may be connected as a pulse-transmitter for an electronic control unit which controls a driving motor belonging to the flap-actuating mechanism. Said control unit can then control the influx of operating energy to the driving motor in dependence upon the pulses which can be generated by varying the actuating state of the switch. Alternatively, the electric switch may be disposed in an operating-energy supply circuit for a driving motor belonging to the flap-actuating mechanism, so that said switch can interrupt and/or release, depending upon its actuating state, the influx of operating energy to the driving motor.

In one form of embodiment, the control-face means may act upon a movably disposed intermediate member which, in turn, acts upon the switching member. Under these circumstances, the control-face means have a first control face, which permits or brings about the setting of the intermediate member into a first intermediate member position in which the switching member occupies a first actuating state, and also a second control face which is disposed in an angularly offset manner in relation to the first control face and which permits or brings about the setting of the intermediate member into a second intermediate-member position in which the switching member occupies a second actuating state which is different from the first actuating state. In order to keep the intervening member in the first and/or second intermediate-member position, even when the control face in question is no longer acting upon said intervening member, the latter may be disposed so as to be positionally inert as a result of the action of friction. It is also possible to envisage the pretensioning of the intermediate member towards one of its two intermediate-member positions.

The intermediate element may, for example, be formed by a lever arm which is pivotably mounted in the region of one of its ends.

In another form of embodiment, the control-face means may act directly upon the switching member of the switch without the use of an intermediate element.

The control-face means preferably comprise a control face which permits or brings about the setting of the switching member into a modified actuating state at least approximately when the other of the two flap positions of the air flap is reached. In this way, it is possible to identify with certainty that this other flap position has been reached, in order to then stop the movement of the air flap.

In order to reliably identify different positions of the flap-actuating element, the control-face means may comprise two control faces which are disposed in different angular ranges and extend over different lengths in the angular direction and which each permit or bring about the setting of the switching member into the same modified actuating state.

In order to be able to actuate the air flap in both directions of rotation of a driving motor belonging to the flap-actuating mechanism, it is recommended that each control face of the control-face means that permits or brings about the setting of the switching member into a modified actuating state be constructed symmetrically with respect to the direction of movement of the flap-actuating element.

The control-face means may be constructed on the flap-actuating element in an integral manner, but alternatively they may also be constructed on a structural part which is manufactured separately from said flap-actuating element.

The invention will be explained further below with the aid of the appended drawings, in which:

FIG. 1 represents, diagrammatically, an exemplified embodiment of an air-flap device according to the invention with the air flap of the device in a closing position;

FIG. 2 represents the device in FIG. 1, with the air flap in an open position;

Figure 3:
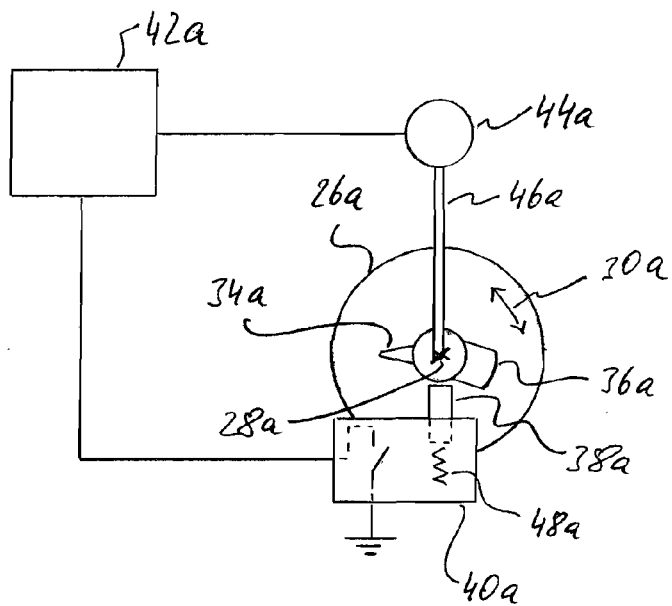
FIG. 3 represents, diagrammatically, components for driving and controlling a flap-actuating element belonging to the device in FIGS. 1 and 2, according to a variant.

FIGS. 1 and 2 are referred to first of all. The air-flap device shown therein, which is designated generally by 10, is intended for installation in a refrigerator and/or freezer for keeping foods cool or freezing them. In the installed state, it permits the selective opening and closing of a cold-air duct through which cold air which has been generated or is available can be introduced into a refrigerating chamber in the appliance. The air-flap device 10 comprises a casing arrangement 12 which delimits the said cold-air duct, at least over part of the length of said duct. In FIGS. 1 and 2, the cold-air duct is designated generally by 14. The casing arrangement 12 forms a pass-through aperture 16 which separates an upper part of the cold-air duct 14 from a lower part and can be occluded or unblocked, as required, by means of an air flap 18. Said air flap 18 is mounted on the casing arrangement 12 so as to be pivotable about a first axis of rotation 20, under which circumstances it can be displaced between an open position which is shown in FIG. 1, and a closed position which is shown in FIG. 2. In the open position, the air flap 18 rests against an edge 22 of the pass-through aperture 16 and occludes the latter in an at least approximately leakproof manner.

A pretensioning spring 24, which operates between the casing arrangement 12 and the air flap 18, pretensions said air flap 18 towards its closing position. Basically, any desired type of spring may be used for the pretensioning spring 24. In the example shown in FIGS. 1 and 2, it is formed by a spiral spring, the ends of whose spiral are supported against the casing arrangement 12 and the air flap 18 respectively.

A flap-actuating mechanism, which comprises a flap-actuating element 26 which can be driven by means of an electric driving motor of which no further details are represented in FIGS. 1 and 2, serves to actuate the air flap 18, i.e. to transfer it out of the closing position and into the open position. In the exemplified case shown, the said flap-actuating element is constructed as a body of revolution which is mounted so as to be rotationally movable in an unlimited manner in both directions of rotation about an axis of rotation 28 which is disposed at a distance from the first axis of rotation 20 and extends substantially parallel to the latter. A double arrow 30 illustrates this unlimited rotational mobility of the flap-actuating element 26 in both directions of rotation.

Said flap-actuating element 26 is designed with a diagrammatically indicated flap-engaging section 32 which is intended and constructed for engagement with the air flap 18. The arrangement of the flap-actuating element 26 relative to the air flap 18 is such that the flap-engaging section 32 is located within the pivoting space of the air flap 18 in part of the rotational angle range of the flap-actuating element 26, but is otherwise outside said pivoting space of the air flap 18. The pivoting space of the air flap 18 is the space delimited by the latter between its closing and open positions. When the air flap 18 is in the closing position shown in FIG. 1, the flap-engaging section 32 is located outside the pivoting space of said air flap 18. In the open position in FIG. 2, on the other hand, the flap-engaging section 32 is moved into said pivoting space of the air flap 18.

In the exemplified case shown in FIGS. 1 and 2, the flap-actuating element 26 is located—referred to the axis of rotation 20—axially alongside the air flap 18, the flap-engaging section 32 being constructed as an axial projection which protrudes axially from the flap-actuating element 26 towards the air flap 18, and overlaps axially with the latter. If the flap-actuating element 26 is rotated out of its rotational position which is shown in FIG. 1 in the anticlockwise direction about the second axis of rotation 28, the flap-engaging section 32 approaches the air flap 18 and finally strikes against the latter, namely on the left-hand side of said axis of rotation 28. As the flap-actuating element 26 continues to rotate in the anticlockwise direction, the flap-engaging section 32 lifts the air flap 18 out of the closing position against the action of the pretensioning spring 24, and presses it towards its open position. The maximum degree of opening of the air flap 18 is reached when an imaginary connecting line between the second axis of rotation 28 and the flap-engaging section 32 is substantially perpendicular to the plane of the flap of the air flap 18. The flap-engaging section 32 is then moved into the pivoting space of the air flap 18 to the maximum extent. FIG. 2 approximately represents this state.

As the flap-actuating element 26 rotates still further in the anticlockwise direction, the flap-engaging section 32 moves out again in the direction out of the pivoting space of the air flap 18. In the process, the pretensioning force of the pretensioning spring 24 causes the air flap 18 to run after the flap-engaging section 32, so to speak, until said air flap strikes against the edge 22 of the aperture and occupies the closing position according to FIG. 1 again at the moment at which the flap-engaging section 32 leaves the pivoting space of the air flap 18 again.

It is thus possible, by continued rotation of the flap-actuating element 26 about the axis of rotation 28 in the anticlockwise direction, to bring about repeated opening and closing of the air flap 18. But the same effect can also be achieved in the case of rotation in the opposite direction of rotation, that is to say, in the clockwise direction when looking at FIGS. 1 and 2. Because, even when rotated in the clockwise direction, the flap-engaging section 32 moves from outside the pivoting space of the air flap 18 into said pivoting space, through the latter and then out again. When the flap-actuating element 26 is rotated in the clockwise direction, however, the flap-engaging section 32 impinges upon the air flap 18 at a point which lies on the right-hand side of the second axis of rotation 28 in FIG. 1 and thus closer to the first axis of rotation 20 than in the case of rotation in the anticlockwise direction. On account of the shorter lever in the case of rotation in the clockwise direction, a higher force is required in order to be able to lift the air flap 18 out against the action of the pretensioning spring 24. It is therefore expedient to choose, as the preferred direction of rotation of the flap-actuating element 26, the one in which the flap-engaging section 32 impinges upon the air flap 18 in a manner further removed from the axis of rotation 20, and consequently more favourable leverages are present. In the way in which FIGS. 1 and 2 are viewed, the anticlockwise direction is therefore the preferred direction.

Regardless of the possible choice of a preferred direction of rotation for the flap-actuating element 26, the driving motor and the mechanical driving connection between said motor and said flap-actuating element 26 expediently permit driving of said element in both directions of rotation. This may advantageously be used for the purpose of reversing the direction of driving of the flap-actuating element 26 if it encounters excessively high resistance in one direction of rotation, for instance because the air flap 18 is frozen fast to the edge 22 of the aperture or because the formation of ice is making rotational mobility of the air-flap bearing difficult. Reversal of the direction of rotation then allows repeated "knocking" of the flap-engaging section 32 against the air flap 18 at a point which is further removed from the axis of rotation 20 and at a point on the flap 18 which lies closer to the said axis, alternately. Any iced-up areas can be more successfully broken open by repeated impact-type action of this kind on the air flap 18. It is particularly advantageous that the flap-actuating element 26 can pick up momentum in that rotational angle range in which the flap-engaging section 32 is located outside the pivoting space of the air flap 18. It is possible to impart to the flap-engaging section 32 a larger or smaller motional impetus, according to the rapidity with which the driving motor can start up, which impetus can be transmitted to the door flap 18 on striking against the latter. All in all, it is thus possible to guarantee high functional reliability of the air-flap device 10, even under the comparatively harsh temperature conditions of a refrigerator and/or freezer.

As a modification to the exemplified embodiment in FIGS. 1 and 2, it is possible to envisage disposing the flap-actuating element 26 in the axial region of the air flap 18, outside the latter's pivoting space, and to design it with a radial projection which serves as the flap-engaging section and runs into the pivoting space of the air flap 18 on rotation of the flap-actuating element, and lifts said flap out as it does so.

Figure 4:
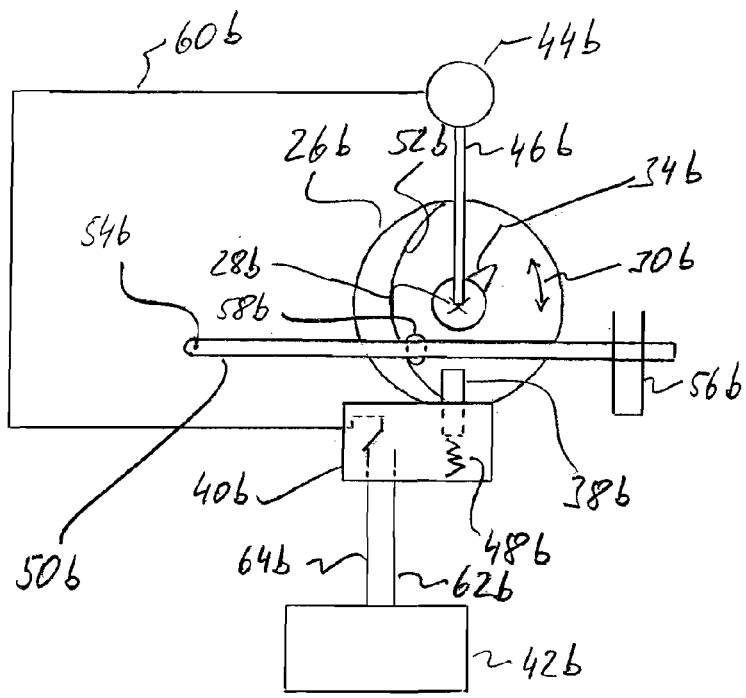
FIG. 4 represents components for driving and controlling the flap-actuating element according to another variant.

FIGS. 3 and 4 illustrate diagrammatically two variants for controlling a driving motor for the flap-actuating element 26 of the exemplified embodiment in FIGS. 1 and 2. In all the figures, components which are identical or operate in an identical manner are provided with the same reference numerals, although a lower-case letter is additionally appended in FIGS. 3 and 4.

In the variant in FIG. 3, the flap-actuating element 26 carries, on its side that faces axially away from the flap-engaging section 32 in FIGS. 1 and 2, two control faces 34*a*, 36*a* which are constructed symmetrically, in terms of the direction of rotation, with respect to rotation about the axis 28*a*, i.e. possess an identical contour path in both angular directions. The two control faces 34*a*, 36*a* may alternatively be disposed on a control-face carrier element which is separate from the flap-actuating element 26*a* but is disposed for joint rotation with the latter. They are offset in relation to one another in the angular direction and devoid of overlap. Their angular extension is different, the control face 34a having a shorter angular extension, and the control face 36a a greater angular extension, in the exemplified case shown.

When the flap-actuating element 26a rotates, the control faces 34a, 36a pass into engagement alternately with a mechanical switching member 38a belonging to an electric switch 40a which serves as a pulse-transmitter for an electronic control unit 42a. Said control unit 42a controls, in dependence upon the electric pulses which it receives via the switch 40a, the supplying of operating energy to an electric driving motor 44a which drives the flap-actuating element 26a about the axis of rotation 28a via a diagrammatically represented mechanical driving connection 46a. Every time one of the control faces 34a, 36a runs up onto the switching member 38a, the control face in question presses said switching member 38a down, against the action of a pretensioning spring 48a, under which circumstances the actuating state of the switch 40a changes. After the control face has run past the switching member 38a, the pretensioning spring 48a resets said switching member 38a into the previous rest/actuating state again. The two actuating states of the switching member 38a correspond to different electrical states of the switch 40a, which are used for pulse-forming. Depending upon which of the control faces 34a, 36a impinges upon the switching member 38a, the switch 40a supplies a shorter or longer pulse to the control unit 42a since, as a result of the different angular lengths of the control faces 34a, 36a, the switching member 38a is held in its pressed-down state for different lengths of time—assuming that the rotational speed of the flap-actuating element 26a remains the same.

The pulses supplied by the switch 40a enable the control unit 42a to identify the rotational position of the flap-actuating element 26a and consequently the state of pivoting of the air flap 18. The shorter pulse brought about by the shorter control face 34a is preferably used to identify the open position of the air flap 18. For this purpose, the control face 34a is disposed, in the peripheral direction of the flap-actuating element 26a, in such a way, relative to the flap-engaging section 32 which is not included in the drawing in FIG. 3, that the control face 34a presses down the switching member 38a when the air flap 18 is held open to the maximum extent by said flap-engaging section 32. The angular extension of the control face 34a, and thereby the length in time of the pulse generated by said control face, are so short that the beginning and end of the pulse only lie shortly before or shortly after, respectively, the maximum open position of the air flap 18 is reached. The control unit 42a is thus able, immediately after identifying the shorter pulse, to stop the influx of operating energy to the motor 44a and arrest the flap-actuating element 26a.

The air flap 18 then remains in its open position until the control unit 42a decides, in dependence upon the measuring signals from a temperature-sensor arrangement, of which no further details are represented, that the air flap 18 is to be closed again. Said control unit then re-establishes the influx of operating energy to the driving motor 44a. The latter drives the flap-actuating element 26 until the longer control face 36a has run past the switching member 38a and the control unit 42a has accordingly received the longer pulse. After identifying the longer pulse, the control unit 42a stops the influx of operating energy to the motor 44a once again; the flap-actuating element 26 then comes to a standstill again. The relative angular location of the longer control face 36a in relation to the flap-engaging section 32 belonging to the flap-actuating element 26a is selected in such a way that the air flap 18 returns to its closing position according to FIG. 1 before the control face 36a has completely travelled past the switching member 38a. In this way, it is ensured that the motor 44a is arrested once when the air flap 18 is close to the open position of the air flap 18, and once when the air flap 18 is in the closing position. If the measuring signals from the temperature-sensor arrangement indicate that a further influx of cold air is needed, the control unit 42a re-establishes the influx of operating energy to the motor 44a. The flap-actuating element 26 is then rotated again until the short control face 34a has travelled over the switching member 38a, i.e. until the air flap 18 is open again.

If the driving motor 44a has a constant rotational speed, one of the control faces 34a, 36a alone may be sufficient to enable the control unit 42a to control, time-wise, the supplying of operating energy to the motor 44a. The control unit 42a is able, with the aid of the pulse generated by the single control face and of the rotational speed of the motor 44a, to ascertain precisely where the flap-engaging section 32 is located and which position the air flap 18 is in at any point in time. In the event of only a single control face being used, recourse is expediently had to the shorter control face 34a, since identification of the open position of the air flap is more critical, time-wise, than identification of the closing position.

Whereas, in the variant in FIG. 3, the control faces of the flap-actuating element interact directly with the switching member belonging to the electric switch, and said switch is used as a pulse-transmitter for the control unit, the variant in FIG. 4 makes use of a positionally inert intermediate member 50b between the control faces 34b, 52b of the flap-actuating element 26b and the switching member 38b. Moreover, in the variant in FIG. 4, the switch 40b is integrated into the operating-energy supply circuit of the motor 44b, so that it releases or interrupts the influx of operating energy to the motor 44b in dependence upon its switching state.

The intermediate member 50b is constructed as a lever arm which is disposed so as to be pivotable about an axis of pivoting 54b which is substantially parallel to the axis of rotation 28b of the flap-actuating element 26b but is disposed at a distance from said axis. The lever arm 50b is positionally inert to the extent that, although it is pivotingly movable, it nevertheless remains positionally inert in any pivoting position as a result of the action of friction. Said friction may be generated at the mounting point of the lever arm 50b. In the variant in FIG. 4, however, it is generated in the region of the free end of the lever arm 50b. For this purpose, said lever arm 50b is displaceable in a sliding manner on the springy legs of the U of a U-shaped spring 56b, under which circumstances pretensioning of the legs of the spring ensure the desired friction of the lever arm 50b against said legs.

The control face 34b brings about, in a manner similar to the control face 34a in FIG. 3, the pressing-down of the lever arm 50b and consequently of the switching member 38b in the region of the maximum open position of the air flap. The degree of positional inertia of the lever arm 50b may be sufficiently great that it cannot be overcome by the pretensioning spring 48b belonging to the switching member 38b, after the control face 34b has run past the lever arm 50b. Said lever arm 50b would then remain in its downwardly pressed position. The control face 52b permits resetting of the lever arm 50b in the upward direction. It operates in the opposite direction to the control face 34b and is oriented, unlike the latter, towards the axis of rotation 28b of the flap-actuating element 26b. It is likewise constructed symmetrically, in terms of the direction of rotation, but—viewed in the peripheral direction—is at the smallest distance from the axis of rotation 28b in its centre, and at an increasingly greater distance on either side. Disposed on the lever arm 50b is a peg 58b which, when the lever arm 50b is in the downwardly pressed state, runs up onto the control face 52*b* when the flap-actuating element 26*b* is rotated. The interaction of the peg 58*b* and the control face 52*b* brings about the resetting of the lever arm 50*b* in the upward direction, so that the pretensioning spring 48*b* is able to relax again and the switching member 38*b* returns to its extended position.

In this instance, the switch 40*b* is configured as a changeover switch which, depending upon its switching state, selectively connects an operating-energy supply line 60*b* leading to the motor 44*b* to one of two feed lines 62*b*, 64*b* which extend between the switch 40*b* and the control unit 42*b*. Said control unit 42*b* is set up for the purpose of making available operating energy for the motor 44*b* selectively on each of the two feed lines 62*b*, 64*b*. The way in which the flap-actuating mechanism according to FIG. 4 functions is as follows: If the measurements from a temperature-sensor arrangement connected to the control unit 42*b* indicate that an influx of cold air is needed and the air flap 18 should accordingly be opened, the control unit 42*b* makes available operating energy on the feed line 62*b* or 64*b* which is connected to the line 60*b* at that moment. Let it be assumed, for example, looking at FIG. 4, that this is the feed line 64*b*. The motor 44*b* which is supplied with operating energy in this way via the lines 64*b*, 60*b* then drives the flap-actuating element 64*b* in, for example, the clockwise direction until the control face 34*b* runs up onto the lever arm 50*b* and presses the latter downwards. The accompanying pressing-down of the switching member 38*b* brings about a switching-over of the switch 40*b* and thereby an interruption in the supplying of operating energy to the motor 44*b*. The flap-actuating element 26*b* comes to a standstill in a position in which the air flap 18 is open. As soon as the measuring signals from the temperature-sensor arrangement signal that the refrigerating chamber supplied with the cold air has been cooled down sufficiently, the control unit 42 makes available, on the other of the two feed lines, that is to say the feed line 62*b* for example, operating energy which causes the motor 44*b* to start up again. The flap-actuating element 26*b* therefore begins to rotate again, under which circumstances the air flap 18 drops back into its closing position and the peg 58*b* on the lever arm 50*b* runs up onto the control face 52*b*. As soon as said lever arm 50*b* has been reset in the upward direction sufficiently to allow the switching state of the switch 40*b* to reverse abruptly, no further current flows to the motor 44*b*, for which reason the latter comes to a stand-still.

The driving motor 44*a* in FIG. 3, or 44*b* in FIG. 4, is preferably a synchronous motor which is operated by alternating current and which can be driven in both directions of rotation without inhibition and is capable of reversing the direction of rotation automatically in the event of excessively high resistance to rotation occurring, such as can happen if the air flap ices up. In this way, it is possible, without any additional electronic control means, to carry out that to-and-fro movement of the flap-actuating element which has been touched upon above, until the relevant striking action against the air flap occurs. As an alternative to a synchronous motor, it is possible to envisage using a controlled stepping motor. Under these circumstances, excessively high resistance can be identified via the current consumption of the motor and can be converted by the control unit into a command to reverse the direction of rotation.

As a modification to the exemplified embodiment in FIG. 4, it is possible to envisage pretensioning the lever arm 50*b* by means of a pretensioning spring, of which no further details are represented, in one direction of pivoting, for example towards the switching member 38*b*. There is then provided, on the flap-actuating element 26*b*, at least one control face by means of which the lever arm 50*b* can be pulled away, or pressed away, out of its pretensioned position. If desired, it is possible to provide, on said flap-actuating element 26*b*, one or more further control faces which assist the rapid dropping-back of the lever arm 50*b* into the pretensioned position.

The invention claimed is:

1. A refrigerator and/or freezer for equipping a kitchen, said refrigerator and/or freezer comprising:
    an air flap which is mounted in the refrigerator and/or freezer so as to be pivotable about a first axis of rotation between an open position and a closing position and which, in the open position, unblocks an air-passage aperture for the passage of air and, in the closing position, blocks said air-passage aperture, at least substantially, against the passage of air; and
    a motorized flap-actuating mechanism for displacing the air flap in a pivoting manner;
    wherein the flap-actuating mechanism comprises a movably disposed flap-actuating element having a flap-engaging section which can be moved, as a result of movement of said flap-actuating element, from outside the pivoting space of the air flap in a position of disengagement from the air flap into said pivoting space in order, in doing so, to strike with a motional impetus against the air flap to come into a lifting engagement with the air flap and displace the air flap out of one of the two flap positions towards the other.

2. The refrigerator and/or freezer according to claim 1, wherein the flap-actuating element is disposed so as to be rotatable about a second axis of rotation which is substantially parallel to the first axis of rotation but extends at a distance from the latter, and that the flap-engaging section can be moved, as a result of rotation of the flap-actuating element, from outside the pivoting space of the air flap into said pivoting space.

3. The refrigerator and/or freezer according to claim 2, wherein the flap-actuating element is disposed in such a way that the flap-engaging section can be moved, as a result of rotation of the flap-actuating element, into the pivoting space of the air flap, through said space and out of it again, and wherein the flap-actuating mechanism comprises an electric driving motor which drives the flap-actuating element about the second axis of rotation and which is designed to operate in opposite directions of rotation.

4. The refrigerator and/or freezer according to claim 1, wherein the air flap is pretensioned into one of its two positions.

5. The refrigerator and/or freezer according to claim 4, wherein the pretensioned position is the closing position of the air flap.

6. The refrigerator and/or freezer according to claim 1, wherein the flap-actuating mechanism comprises control-face means, which are disposed in a fixed relative location in relation to the flap-engaging section for joint movement with the latter, for the purpose of controlling a mechanically actuatable switching member belonging to at least one electric switch.

7. The refrigerator and/or freezer according to claim 6, wherein the electric switch is connected as a pulse-transmitter for an electronic control unit which controls a driving motor belonging to the flap-actuating mechanism.

8. The refrigerator and/or freezer according to claim 6, wherein the electric switch is disposed in an operating-energy supply circuit for a driving motor belonging to the flap-actuating mechanism.

9. The refrigerator and/or freezer according to claim 6, wherein the control-face means act upon a movably disposed intermediate member which, in turn, acts upon the switching member, the control-face means have a first control face which permits or brings about the setting of the intermediate member into a first intermediate-member position in which the switching member occupies a first actuating state, and having a second control face which is disposed in an angularly offset manner in relation to the first control face and which permits or brings about the setting of the intermediate member into a second intermediate-member position in which the switching member occupies a second actuating state which is different from the first actuating state.

10. The refrigerator and/or freezer according to claim 9, wherein the intermediate member is disposed so as to be positionally inert as a result of the action of friction.

11. The refrigerator and/or freezer according to claim 9, wherein the intermediate member is pretensioned towards one of its two intermediate-member positions.

12. The refrigerator and/or freezer according to claim 9, wherein the intermediate element is formed by a lever arm which is pivotably mounted in the region of one of its ends.

13. The refrigerator and/or freezer according to claim 6, wherein the control-face means act directly upon the switching member of the switch.

14. The refrigerator and/or freezer according to claim 6, wherein the control-face means comprise a control face which permits or brings about the setting of the switching member into a modified actuating state at least approximately when the other of the two flap positions of the air flap is reached.

15. The refrigerator and/or freezer according to claim 6, wherein the control-face means comprise two control faces which are disposed in different angular ranges and extend over different lengths in the angular direction and which each permit or bring about the setting of the switching member into the same modified actuating state.

16. The refrigerator and/or freezer according to claim 6, wherein each control face of the control-face means that permits or brings about the setting of the switching member into a modified actuating state is constructed symmetrically with respect to the direction of movement of the flap-actuating element.

17. The refrigerator and/or freezer according to claim 6, wherein the control-face means are constructed on the flap-actuating element in an integral manner.

* * * * *